US009619410B1

(12) United States Patent
Brandenberger

(10) Patent No.: US 9,619,410 B1
(45) Date of Patent: Apr. 11, 2017

(54) SYSTEMS AND METHODS FOR PACKET SWITCHING

(71) Applicant: JPMorgan Chase Bank, N.A., New York, NY (US)

(72) Inventor: Philip J. Brandenberger, Montclair, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 403 days.

(21) Appl. No.: 14/045,415

(22) Filed: Oct. 3, 2013

(51) Int. Cl.
*G06F 13/00* (2006.01)
*H04L 12/28* (2006.01)
*G06F 13/20* (2006.01)

(52) U.S. Cl.
CPC .............. *G06F 13/20* (2013.01); *G06F 13/00* (2013.01); *H04L 12/28* (2013.01)

(58) Field of Classification Search
USPC ........ 710/110, 305, 316, 317, 240; 370/389, 370/390, 392, 398, 395.31
See application file for complete search history.

(56) References Cited

U.S. PATENT DOCUMENTS

| | | | |
|---|---|---|---|
| 4,751,702 A | 6/1988 | Beier et al. |
| 5,027,269 A | 6/1991 | Grant et al. |
| 5,075,881 A | 12/1991 | Blomberg et al. |
| 5,313,616 A | 5/1994 | Cline et al. |
| 5,347,518 A | 9/1994 | Lee |
| 5,386,551 A | 1/1995 | Chikira et al. |
| 5,446,895 A | 8/1995 | White et al. |
| 5,539,885 A | 7/1996 | Ono et al. |
| 5,549,117 A | 8/1996 | Tacklind et al. |
| 5,563,998 A | 10/1996 | Yakish et al. |
| 5,566,297 A | 10/1996 | Devarakonda |
| 5,594,863 A | 1/1997 | Stiles |

(Continued)

FOREIGN PATENT DOCUMENTS

WO    01/74043    10/2001

OTHER PUBLICATIONS

Alessandra Agostini et al, A light workflow management system using simple process models, Computer Supported Cooperative Work, pp. 335-363 (Nov. 2000).

(Continued)

*Primary Examiner* — Khanh Dang
(74) *Attorney, Agent, or Firm* — Goodwin Procter LLP

(57) ABSTRACT

A low latency packet switching system comprising a switching device and a processing device. The switching device may include a first plurality of input/output (I/O) ports and a second plurality of I/O ports, wherein each port of the first plurality of ports may be electrically coupled to a pluggable transceiver socket configured to receive a cable connector. The processing device may include a plurality of transceivers electrically coupled to the second plurality of ports. The switching device may be configured to receive a first electric signal encoding one or more incoming data packets. The switching device may be programmed to output the first electric signal to one or more ports, in accordance with a programmable port mapping scheme. The processing device may be configured to receive the first electric signal and to output a second electric signal encoding one or more modified data packets derived from the incoming data packets.

24 Claims, 6 Drawing Sheets

(56) References Cited

U.S. PATENT DOCUMENTS

| | | | |
|---|---|---|---|
| 5,630,047 A | 5/1997 | Wang | |
| 5,630,069 A | 5/1997 | Flores et al. | |
| 5,655,074 A | 8/1997 | Rauscher | |
| 5,701,471 A | 12/1997 | Subramanyam | |
| 5,712,971 A | 1/1998 | Stanfill et al. | |
| 5,721,913 A | 2/1998 | Ackroff et al. | |
| 5,721,914 A | 2/1998 | De Vries | |
| 5,748,878 A | 5/1998 | Rees et al. | |
| 5,752,034 A | 5/1998 | Srivastava | |
| 5,758,061 A | 5/1998 | Plum | |
| 5,768,506 A | 6/1998 | Randell | |
| 5,781,448 A | 7/1998 | Nakamura et al. | |
| 5,784,562 A | 7/1998 | Diener | |
| 5,799,297 A | 8/1998 | Goodridge et al. | |
| 5,806,075 A | 9/1998 | Jain et al. | |
| 5,828,883 A | 10/1998 | Hall | |
| 5,835,770 A | 11/1998 | Shum et al. | |
| 5,842,196 A | 11/1998 | Agarwal et al. | |
| 5,845,292 A | 12/1998 | Bohannon et al. | |
| 5,854,906 A * | 12/1998 | Van Loo | 710/110 |
| 5,872,976 A | 2/1999 | Yee et al. | |
| 5,884,037 A | 3/1999 | Aras et al. | |
| 5,903,721 A | 5/1999 | Sixtus | |
| 5,903,897 A | 5/1999 | Carrier, III et al. | |
| 5,920,719 A | 7/1999 | Sutton et al. | |
| 5,937,198 A | 8/1999 | Nelson et al. | |
| 5,960,196 A | 9/1999 | Carrier, III et al. | |
| 5,960,445 A | 9/1999 | Tamori et al. | |
| 5,995,965 A | 11/1999 | Experton | |
| 6,003,075 A | 12/1999 | Arendt et al. | |
| 6,009,274 A | 12/1999 | Fletcher et al. | |
| 6,026,237 A | 2/2000 | Berry et al. | |
| 6,028,938 A | 2/2000 | Malkin et al. | |
| 6,029,002 A | 2/2000 | Afifi et al. | |
| 6,058,393 A | 5/2000 | Meier et al. | |
| 6,061,503 A | 5/2000 | Chamberlain | |
| 6,061,686 A | 5/2000 | Gauvin et al. | |
| 6,067,412 A | 5/2000 | Blake et al. | |
| 6,073,107 A | 6/2000 | Minkiewicz et al. | |
| 6,088,700 A | 7/2000 | Larsen et al. | |
| 6,101,601 A | 8/2000 | Matthews et al. | |
| 6,108,673 A | 8/2000 | Brandt et al. | |
| 6,125,390 A | 9/2000 | Touboul | |
| 6,128,708 A | 10/2000 | Fitzpatrick et al. | |
| 6,138,112 A | 10/2000 | Slutz | |
| 6,145,121 A | 11/2000 | Levy et al. | |
| 6,167,534 A | 12/2000 | Straathof et al. | |
| 6,175,833 B1 | 1/2001 | West et al. | |
| 6,195,676 B1 | 2/2001 | Spix et al. | |
| 6,230,319 B1 | 5/2001 | Britt, Jr. et al. | |
| 6,237,035 B1 | 5/2001 | Himmel et al. | |
| 6,237,143 B1 | 5/2001 | Fontana et al. | |
| 6,243,862 B1 | 6/2001 | Lebow | |
| 6,247,029 B1 | 6/2001 | Kelley et al. | |
| 6,249,877 B1 | 6/2001 | Kawakami et al. | |
| 6,269,479 B1 | 7/2001 | Puram | |
| 6,279,039 B1 | 8/2001 | Bhat et al. | |
| 6,301,701 B1 | 10/2001 | Walker et al. | |
| 6,311,327 B1 | 10/2001 | O'Brien et al. | |
| 6,363,077 B1 * | 3/2002 | Wong et al. | 370/422 |
| 6,363,499 B1 | 3/2002 | Delo et al. | |
| 6,363,524 B1 | 3/2002 | Loy | |
| 6,405,250 B1 | 6/2002 | Lin et al. | |
| 6,405,364 B1 | 6/2002 | Bowman-Amuah | |
| 6,411,910 B1 | 6/2002 | Eulau et al. | |
| 6,424,981 B1 | 7/2002 | Isaac et al. | |
| 6,438,749 B1 | 8/2002 | Chamberlain | |
| 6,446,126 B1 | 9/2002 | Huang et al. | |
| 6,463,454 B1 | 10/2002 | Lumelsky et al. | |
| 6,466,980 B1 | 10/2002 | Lumelsky et al. | |
| 6,467,052 B1 | 10/2002 | Kaler et al. | |
| 6,470,464 B2 | 10/2002 | Bertram et al. | |
| 6,477,471 B1 | 11/2002 | Hedstrom et al. | |
| 6,502,207 B1 | 12/2002 | Itoh et al. | |
| 6,505,176 B2 | 1/2003 | DeFrancesco, Jr. et al. | |
| 6,513,154 B1 | 1/2003 | Porterfield | |
| 6,519,763 B1 | 2/2003 | Kaufer et al. | |
| 6,526,443 B1 | 2/2003 | Goldsmith et al. | |
| 6,546,506 B1 | 4/2003 | Lewis | |
| 6,560,580 B1 | 5/2003 | Fraser et al. | |
| 6,578,004 B1 | 6/2003 | Cimral et al. | |
| 6,578,006 B1 | 6/2003 | Saito et al. | |
| 6,584,447 B1 | 6/2003 | Fox et al. | |
| 6,587,841 B1 | 7/2003 | DeFrancesco, Jr. et al. | |
| 6,601,017 B1 | 7/2003 | Kennedy et al. | |
| 6,601,018 B1 | 7/2003 | Logan | |
| 6,601,233 B1 | 7/2003 | Underwood | |
| 6,626,953 B2 | 9/2003 | Johndrew et al. | |
| 6,629,266 B1 | 9/2003 | Harper et al. | |
| 6,820,088 B1 | 11/2004 | Hind et al. | |
| 6,826,745 B2 | 11/2004 | Coker et al. | |
| 6,920,467 B1 | 7/2005 | Yoshimoto | |
| 6,934,934 B1 | 8/2005 | Osborne, II et al. | |
| 7,151,777 B2 * | 12/2006 | Sawey | 370/413 |
| 8,285,912 B2 * | 10/2012 | Feero et al. | 710/316 |
| 9,146,890 B1 * | 9/2015 | Brown et al. | |
| 2002/0004912 A1 | 1/2002 | Fung | |
| 2002/0133593 A1 | 9/2002 | Johnson et al. | |
| 2002/0133757 A1 | 9/2002 | Bertram et al. | |
| 2002/0138571 A1 | 9/2002 | Trinon et al. | |
| 2002/0143929 A1 | 10/2002 | Maltz et al. | |
| 2002/0147961 A1 | 10/2002 | Charters et al. | |
| 2002/0162090 A1 | 10/2002 | Parnell et al. | |
| 2002/0165754 A1 | 11/2002 | Tang et al. | |
| 2003/0004848 A1 | 1/2003 | Hellerstein et al. | |
| 2003/0018952 A1 | 1/2003 | Roetzheim | |
| 2003/0033586 A1 | 2/2003 | Lawler | |
| 2003/0041000 A1 | 2/2003 | Zajac et al. | |
| 2003/0065644 A1 | 4/2003 | Horman et al. | |
| 2003/0120539 A1 | 6/2003 | Kourim et al. | |
| 2003/0144868 A1 | 7/2003 | MacIntyre et al. | |
| 2003/0177239 A1 * | 9/2003 | Shinohara et al. | 709/226 |
| 2003/0188290 A1 | 10/2003 | Corral | |
| 2003/0196190 A1 | 10/2003 | Ruffalo et al. | |
| 2003/0202513 A1 * | 10/2003 | Chen et al. | 370/390 |
| 2003/0212518 A1 | 11/2003 | De'Alessandro et al. | |
| 2003/0225662 A1 | 12/2003 | Horan et al. | |
| 2003/0225663 A1 | 12/2003 | Horan et al. | |
| 2004/0032869 A1 * | 2/2004 | Ambe et al. | 370/392 |
| 2005/0027920 A1 * | 2/2005 | Fitzsimmons et al. | 710/317 |
| 2005/0071807 A1 | 3/2005 | Yanai | |
| 2005/0235084 A1 * | 10/2005 | Nariai | 710/110 |
| 2013/0041787 A1 * | 2/2013 | Pilato | 705/30 |
| 2013/0117766 A1 * | 5/2013 | Bax et al. | 719/323 |
| 2014/0269415 A1 * | 9/2014 | Banavalikar et al. | 370/254 |

OTHER PUBLICATIONS

Betwixt: Turning beans into XML, http://web.archive.org/web/20020620000410/http://jakarta.apache.org/commons/betwixt (last visited Nov. 13, 2005).

Claes Wohlin et al, Understanding the Sources of Software Defects: A Filtering Approach (Abstract), 8th Int'l Workshop on Program Comprehension, p. 9 (2000).

CSK Software AG, Business Process Automation and Workflow in the Financial Industry (2003).

D.M. Hilbert et al, An approach to large-scale collection of application usage data over the internet (Abstract), Proc. Int'l Conf. Software Engineering, pp. 136-145 (1998).

David S. Lindsay, Software Evaluation, Tests, and Measurements (Abstract), in ACM Computing Rev. (J.E. Sammet, ed.), p. 519 (1981).

Dimitrious Georgakopoulos et al, An Overview of Workflow Management: From Process Modeling to Workflow Automation Infrastructure, Distributed and Parallel Databases, pp. 119-153 (1995).

Drake E. Lundell Jr. et al, Computer Use—An executive's guide (Abstract), in ACM Computing Rev. (M.A. Duggan, ed.), pp. 48-49 (1974).

Esmond Pitt et al, java.rmi: The Remove Method Invocation Guide, Section 3.5 (2001).

ExoLab Group, Using Castor XML, http://web.archive.org/web/20010827042213/http://www.castor.org/xml_framework.html (last visited Nov. 11, 2005).

(56) References Cited

OTHER PUBLICATIONS

Graham Hamilton, ed., Sun Microsystems JavaBeans API Specification, pp. 54-82 (1997).

IBM Corporation, Code Generation for Database Applications, IBM Tech. Disclosure Bulletin Mar. 1992 (Mar. 1992).

IBM Corporation, OS/2 EE Database Manager SQLJRA Remote Protocol, IBM Tech. Disclosure Bulletin Jan. 1993, pp. 33-36 (Apr. 1993).

J.P. Hudepohl et al, Integrating metrics and models for software risk assessment (Abstract), 7th Int'l Conf. Software Reliability Engineering, p. 93 (1996).

Len Reinhart, Liability management: A new tool for financial consultants, Financial Consultant (Fall/Winter 1996).

Mary Campione et al, Java Tutorial: A Short Course on the Basics, Ch. 5 (3d ed. 2000).

Norman E. Fenton et al, A Critique of Software Defect Prediction Models, IEEE Transactions Software Engineering, pp. 675-689 (Sep./Oct. 1999).

S.G. Linkman, Quantitative monitoring of software development by time-based and intercheckpoint monitoring (Abstract), Software Engineering J., pp. 43-49 (Jan. 1990).

Sanjay Mohapatra et al, Defect Prevention through Defect Prediction: A Case Study at Infosys (Abstract), IEEE Int'l Conf. Software Maintenance, p. 260 (2001).

Steve McConnell, Gauging Software Readiness with Defect Tracking, IEEE Software (May/Jun. 1997).

Sybase Inc., Monitor Client Library 12.5 Progammer's Guide (May 2001).

Tze-Jie Yu et al, An Analysis of Several Software Defect Models, IEEE Transactions Software Engineering, pp. 1261-1270 (Sep. 1988).

V. Basil et al, Understanding and predicting the process of software maintenance releases (Abstract), 18th Int'l Conf. Software Engineering, p. 464 (1996).

Ytzhak Levendel, Reliability Anlaysis of Large Software Systems: Defect Data Modeling, IEEE Transactions Software Engineering, pp. 141-152 (Feb. 1990).

\* cited by examiner

SYSTEMS AND METHODS FOR PACKET SWITCHING

TECHNICAL FIELD

The present disclosure is generally related to computer systems, and is more specifically related to systems and methods implementing low latency packet switching, high bandwidth data inspection and capture, and data flow fan-out.

BACKGROUND

"Switching device" herein shall refer to a computing device that links other data processing devices and/or network segments. A switching device may receive a data packet from a device connected to it and then transmit the data packet to one or more recipient devices. Conventional switching devices may processes and route data packets at the physical (layer 1) and data link layer (layer 2) of the OSI reference model. A switching device may be equipped with interfaces allowing support of various networking media, e.g., Ethernet, Gigabit Ethernet, Fibre Channel, SONET, and/or other communication standards.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods implementing low latency packet switching, high bandwidth data inspection and capture, and data flow fan-out.

Various applications, including, e.g., financial applications, military, security and data replication applications may require switching devices to perform additional data processing (e.g., filtering, time stamping, analysis, unicast or multicast routing, etc.). However, conventional switching devices with data inspection and processing capabilities often demonstrate processing latency which is inadequate for certain applications, e.g., high-frequency trading (HFT). Aspects of the present disclosure address the above noted and various other deficiencies by combining a switching device with a programmable or configurable data processing device (e.g., a field programmable gate array (FPGA) device or an application specific integrated circuit (ASIC) device), in order to perform ultra-low latency data packet processing and/or routing at multiple OSI model layers. Various aspects of the above referenced methods and systems are described in details herein below by way of examples, rather than by way of limitation.

Figure 1:
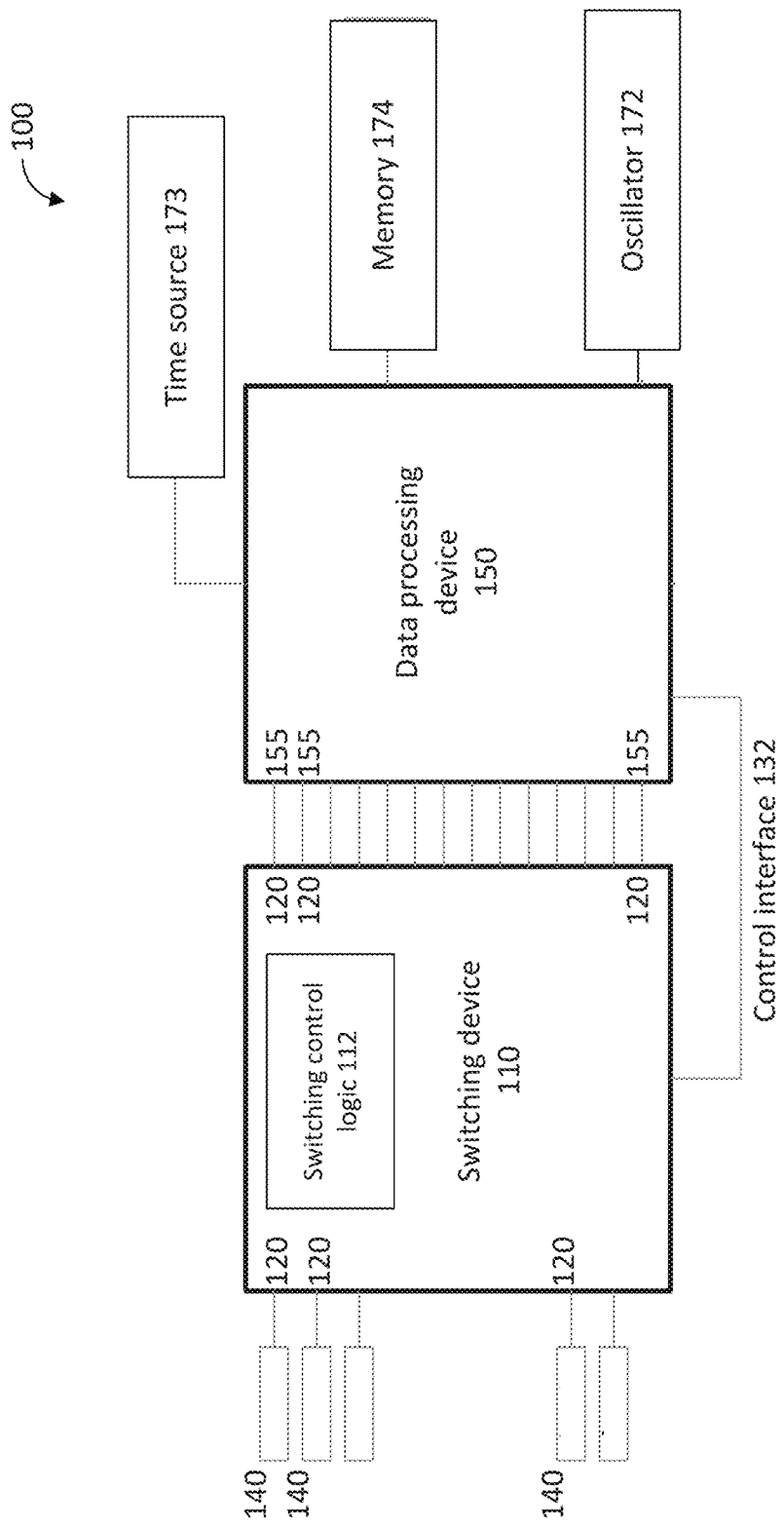
FIG. 1 depicts a high-level component diagram of an example computer system operating in accordance with one or more aspects of the present disclosure.

FIG. 1 schematically depicts a high-level component diagram of an example computer system 100 operating in accordance with one or more aspects of the present disclosure. System 100 may comprise a switching device 110 electrically coupled to a data processing device 150, and configured to operate as described in more details herein below.

While FIG. 1 illustrates switching device 110 and data processing device 150 as two separate devices, in certain implementations the functions performed by computer system 100 as described herein may be performed by a single device. Alternatively, computer system 100 may comprise data processing devices and/or switching devices in various arrangements.

Switching device 110 may be provided, e.g., by an ASIC chip implementing cross-point switching functionality. Switching device 110 may comprise a plurality of input/output (I/O) ports 120. In certain implementations, I/O ports 120 may support differential signaling, involving two complementary electric signals sent over a differential pair comprising two wires.

In certain implementations, a first subset of I/O ports 120 of switching device 110 may be connected to a plurality of pluggable transceiver sockets 140, with input and output ports connecting to each pluggable transceiver socket to form a full-duplex connection. A second subset of I/O ports 120 of switching device 110 may be connected to a plurality of transceivers 155 of data processing device 150, to enable its operation in accordance with one or more aspects of the present disclosure.

Various alternative arrangements of the described components are possible, specifically, multiple switching devices 110 may be arranged in a tree-like structure to increase the number of available I/O ports.

In an illustrative example, a pluggable transceiver socket 140 may be provided by a small form factor pluggable transceiver (SFP). Alternatively, a pluggable transceiver socket 140 may be provided by an enhanced small form factor pluggable transceiver (SFP+), or a multi-channel pluggable module such as QSFP, single or multi-channel direct copper connector, etc. Pluggable transceiver sockets 140 may be configured to support 10/100/1000 Ethernet, 10GBit Ethernet, Fibre Channel, SATA, SAS, SONET, and/or other communication standards.

Switching device 110 may further comprise switching control logic 112 to program M×N port mapping, wherein M and N are positive integers. "M×N port mapping" herein shall refer to electrically connecting each of M input ports to one or more of N output ports. In certain implementations, the M×N port mapping can be implemented as a bi-directional, full-duplex mapping, allowing a symmetric signal flow between each pair of interconnected I/O ports of electric signals representing data packets. Alternatively, the M×N port mapping can be implemented as a uni-directional mapping, specifying a signal flow direction for each pair of interconnected I/O ports, such that the flow of electric signals representing data packets between each pair of interconnected I/O ports would be asymmetric: packets from I/O port A would be forwarded to I/O port B, but not vice versa.

In certain implementations, switching device 110 may further comprise a control interface 132. In an illustrative example, switching device 110 may receive the M×N port mapping via control interface 132 from an external device (not shown in FIG. 1). Alternatively, switching device 110 may receive the M×N port mapping via control interface 132 from data processing device 150.

In an illustrative example, switching control logic 112 may be programmed to connect each I/O port 120 of an arbitrarily designated plurality of I/O ports to any of the remaining I/O ports 120 of the arbitrarily designated plurality of I/O ports. The signal path through the switching device may use no registers and be fully asynchronous, with no restrictions on the phase, frequency, or signal pattern of any input. Port connectivity programming for the switching can be sequential on a port-by-port basis, or multiple port assignments can be queued and issued simultaneously. The entire switching device can be initialized for straight-through, multicast, or other configurations. Unused I/O ports can be powered down to improve the energy efficiency of the switching device in applications that require only a subset of the available I/O ports.

Referring now to data processing device 150, the device may, in illustrative examples, be provided by an FPGA chip or an ASIC chip. Data processing device 150 may communicate to external systems and devices via a plurality of transceivers 155.

Other components of computer system 100 electrically connected to data processing device 150 may, in illustrative examples, include: a high resolution oscillator 172 suitable for accurate timekeeping, a time source 173, a memory device 174, and/or other peripheral processing elements as required.

An electric signal representing one or more data packets may flow from external devices through pluggable transceiver sockets 140 coupled to M input ports of switching device 110, and then may further flow to N ports of switching device 110 in accordance with the programmable M×N port mapping implemented by switching logic 112, and finally may flow to data processing device 150 via a plurality of transceivers 155 coupled to a first subset of N output ports of switching device 110 and/or to one or more external devices through pluggable transceiver sockets 140 coupled to a second subset of N output ports of switching device 110. As noted herein above, the M×N port mapping can be implemented as a uni-directional or bi-directional mapping, respectively allowing a uni-directional or symmetric (bi-directional) signal flow of electric signals between each pair of interconnected I/O ports.

Figure 2:
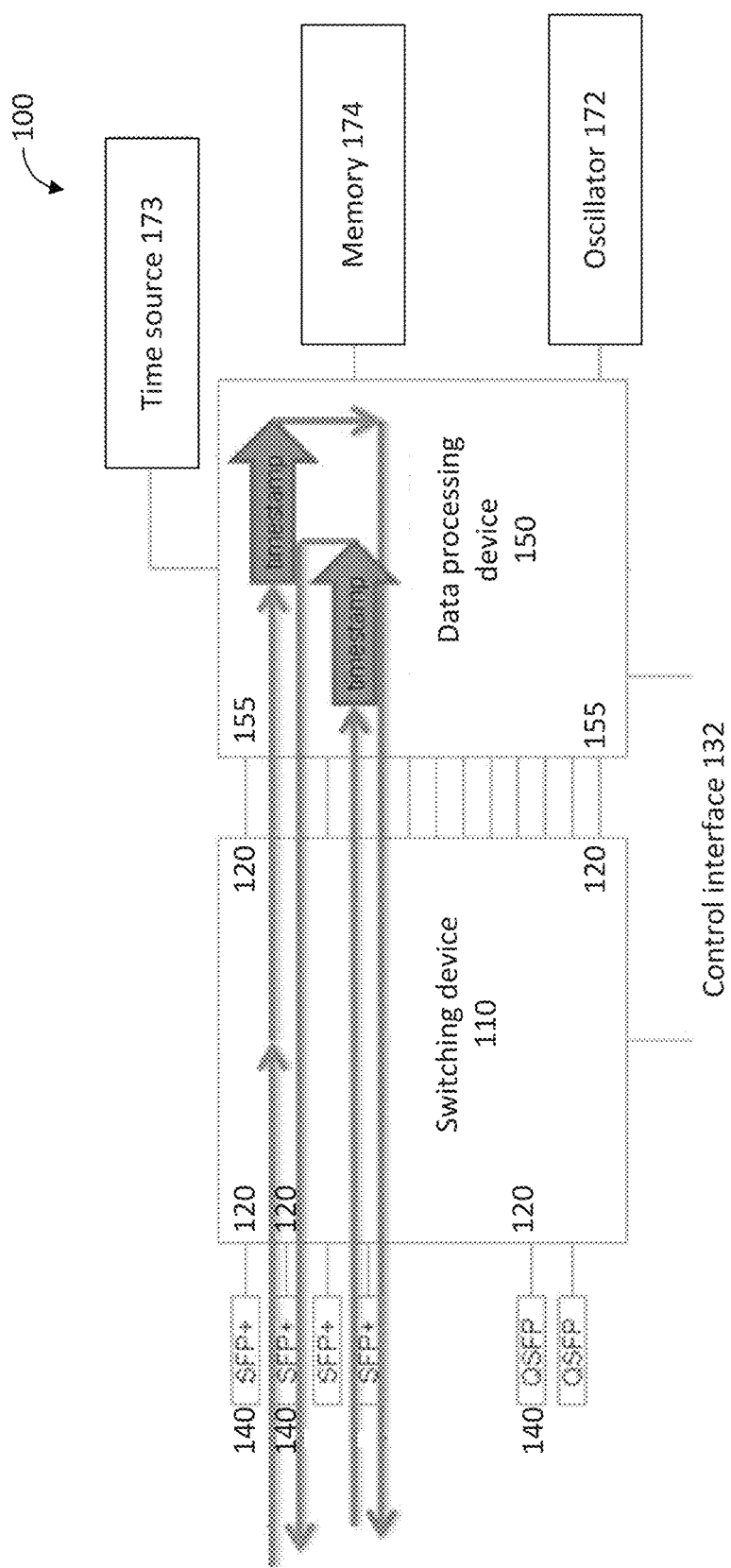
FIG. 2 schematically illustrates an example computer system configured to perform various processing and analysis of incoming data packets, in accordance with one or more aspects of the present disclosure.

In certain implementations, as schematically illustrated by FIG. 2, system 100 may be configured to perform various processing and analysis of incoming data packets, as described in more details herein below. In an illustrative example, data switching device 110 may be configured to connect a plurality of external ports 120 to each other, in accordance with a programmable port mapping scheme. Electric signals representing data packets flowing through those connections may also be sent to switching device 150 via one or more transceivers 155. Data processing device 150 may perform various processing of the incoming data packets, including analyzing, time stamping, filtering, and/or re-transmitting the modified data packets back to switching device 110.

In the illustrative example of FIG. 2, the electric signal representing one or more incoming data packets flowing through the switching device as described herein above (or a new electric signal derived from the above referenced electric signal) may be forwarded to one or more output ports coupled to the front panel pluggable transceiver sockets 140, as well as to data processing device 150 via one or more transceivers 155. Data processing device 150 may be programmed to perform various processing of the data packets received, and then retransmit the modified data packets or information derived from their processing or analysis, via one or more transceivers 155, back to switching device 110 and/or to one or more external devices (not shown in FIG. 2), as described in more details herein below.

In an illustrative example, data processing device 150 may be programmed to insert additional data (such as time stamps) into the incoming data packets before forwarding the data packets to the destination I/O ports and/or to external devices.

In another illustrative example, data processing device 150 may be programmed to enqueue the incoming data packets into a buffer, and to compress or otherwise aggregate the queued data packets before forwarding the data packets to the destination I/O ports and/or to external devices. Data processing device 150 may be programmed to implement various data compression algorithms to perform on-the-fly packet compression. In certain implementations, data processing device 150 may be programmed to select a data compression algorithm based on one or more attributes of the incoming data packets (e.g., network, transport, and/or application level attributes).

Figure 3:
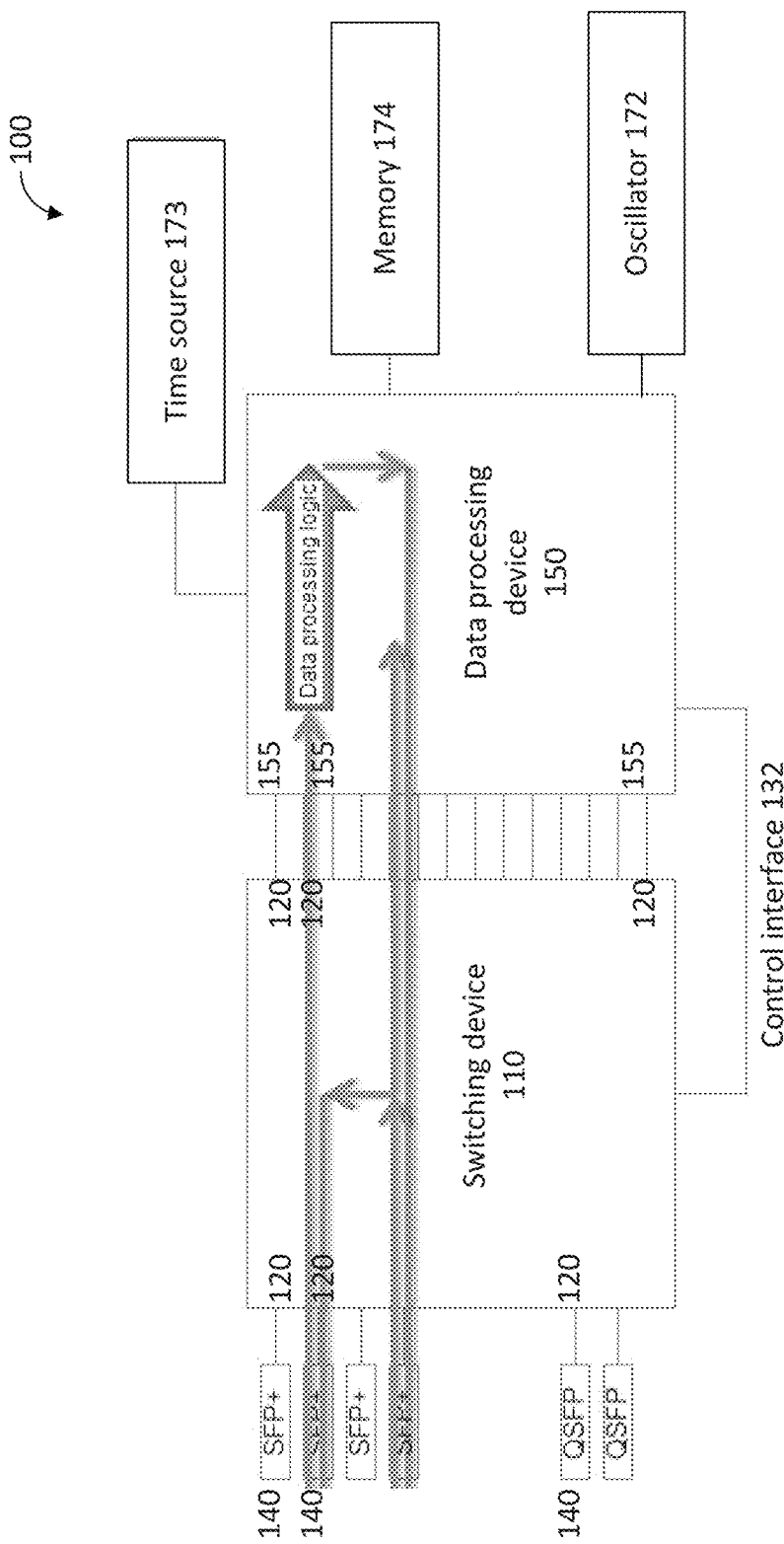
FIG. 3 schematically illustrates an example computer system configured to perform active analysis and/or filtering of data packets flowing through the switching device, in accordance with one or more aspects of the present disclosure.

In certain implementations, as schematically illustrated by FIG. 3, data processing device 150 may perform active analysis and/or filtering of data packets flowing through switching device 110. In the illustrative example of FIG. 3, the electric signal representing one or more incoming data packets flowing through the switching device as described herein above (or a new electric signal derived from the above referenced electric signal) may be forwarded to data processing device 150 via one or more transceivers 155. Data processing device 150 may be programmed to perform various processing of the data packets received, and then retransmit the modified data packets, via one or more transceivers 155, back to switching device 110, as described in more details herein below.

In certain implementations, as schematically shown in FIG. 3, switching device 110 may be configured to transmit the data packets of the return traffic from the destination I/O ports directly to the source I/O port, thus bypassing data processing device 150. In certain implementations, the return traffic bypass may be complemented by forwarding a copy of the return traffic to data processing device 150, thus eliminating the unnecessary latency of data processing of the return traffic.

In an illustrative example, data processing device 150 may be programmed to filter the incoming data packets. In certain implementations, data processing device 150 may be programmed to apply a programmable filter to every incoming data packet. Alternatively, data processing device 150 may be programmed to apply a programmable filter to a subset of the incoming data packets, which may be selected based on one or more attributes of the incoming data packets (e.g., network, transport, and/or application level attributes). In certain implementations, data processing device 150 may be programmed to select a programmable filter based on one or more attributes of the incoming data packets (e.g., network, transport, and/or application level attributes).

In an illustrative example, the programmable filter implemented by data processing device 150 may perform financial risk analysis of the data comprises by the incoming data packets. In another illustrative example, the programmable filter implemented by data processing device 150 may perform other types of application-level filtering of the data comprises by the incoming data packets. In a further illustrative example, the programmable filter implemented by data processing device 150 may perform other types of filtering based on the network and/or transport level attributes of the incoming data packets.

In certain implementations, the programmable filter implemented by data processing device 150 may implement stateless or stateful inspection and/or filtering of the incoming data packets. For implementing stateful inspection and/or filtering, data processing device 150 may be programmed to keep track of multiple communication sessions between a plurality of external systems, and store in the memory a plurality of parameters defining the state for every communication session.

In an illustrative example, the programmable filter implemented by data processing device 150 may inspect the data within one or more incoming data packets, evaluate one or more filtering conditions, and based on the evaluation results, perform one or more of the following actions: pass through one or more data packets without modifying them, modify the data within one or more data packets, drop one or more data packets, and/or terminate the communication session to which one or more data packets belong. In certain implementations, a filtering condition may comprise one or more logical expressions having operands including one or more attributes of the incoming data packets (e.g., network, transport, and/or application level attributes). In a stateful inspection scenario, the logical expression operands may also include one or more state variables of the communication session comprising the data packets being inspected.

Figure 4:
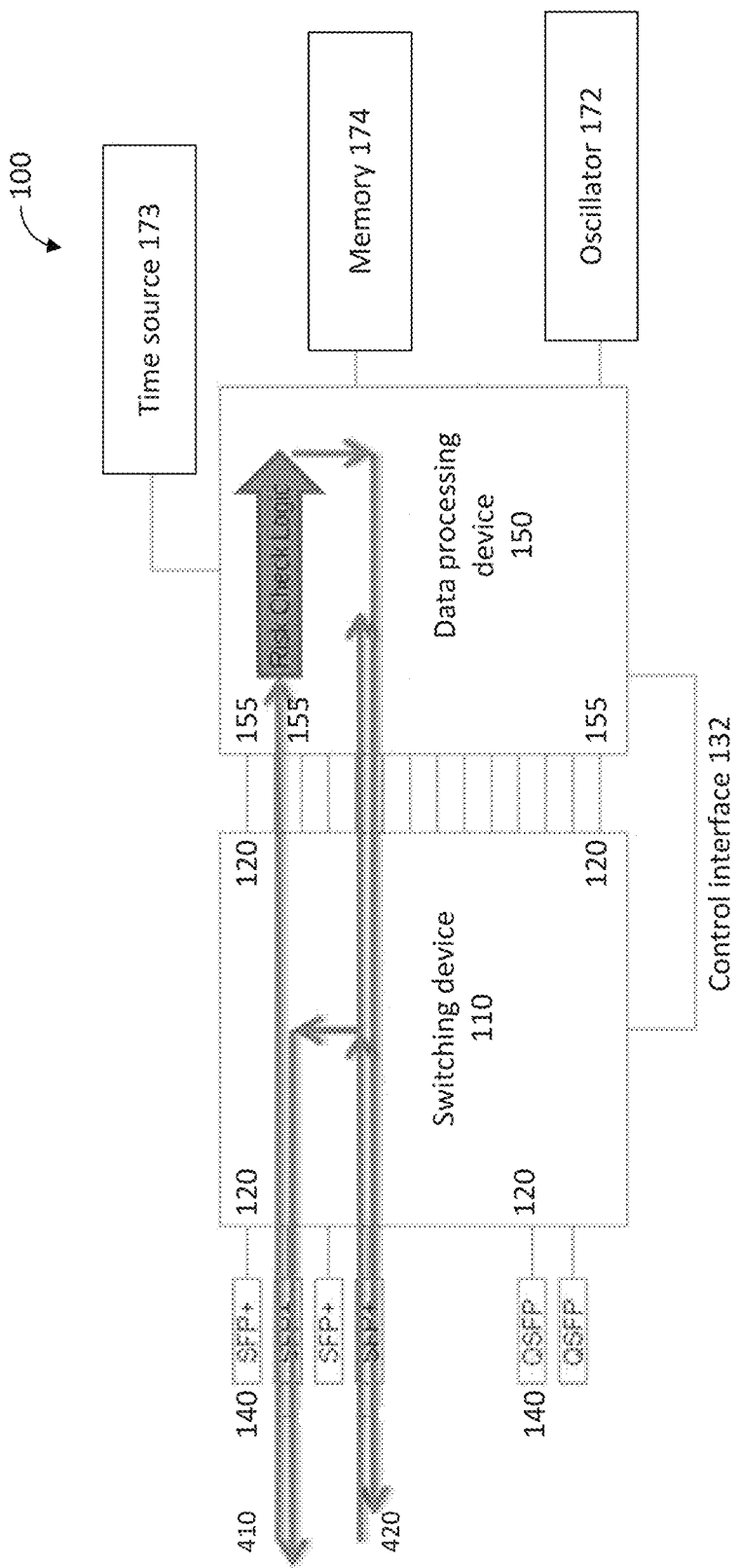
FIG. 4 schematically illustrates an example computer system implementing a financial risk gateway interconnecting a client interface and an exchange interface, in accordance with one or more aspects of the present disclosure.

FIG. 4 schematically illustrates system 100 implementing a financial risk gateway interconnecting a client interface 410 and an exchange interface 420. System 100 performs financial risk analysis on data packets transmitted from client interface 410 to exchange interface 420 with "kill switch" functionality. In an illustrative example, system 100 may drop one or more data packets violating a pre-defined and/or dynamically configurable financial risk condition. In another illustrative example, system 100 may terminate a communication session comprising one or more data packets violating a pre-defined and/or dynamically configurable financial risk condition.

Figure 5:
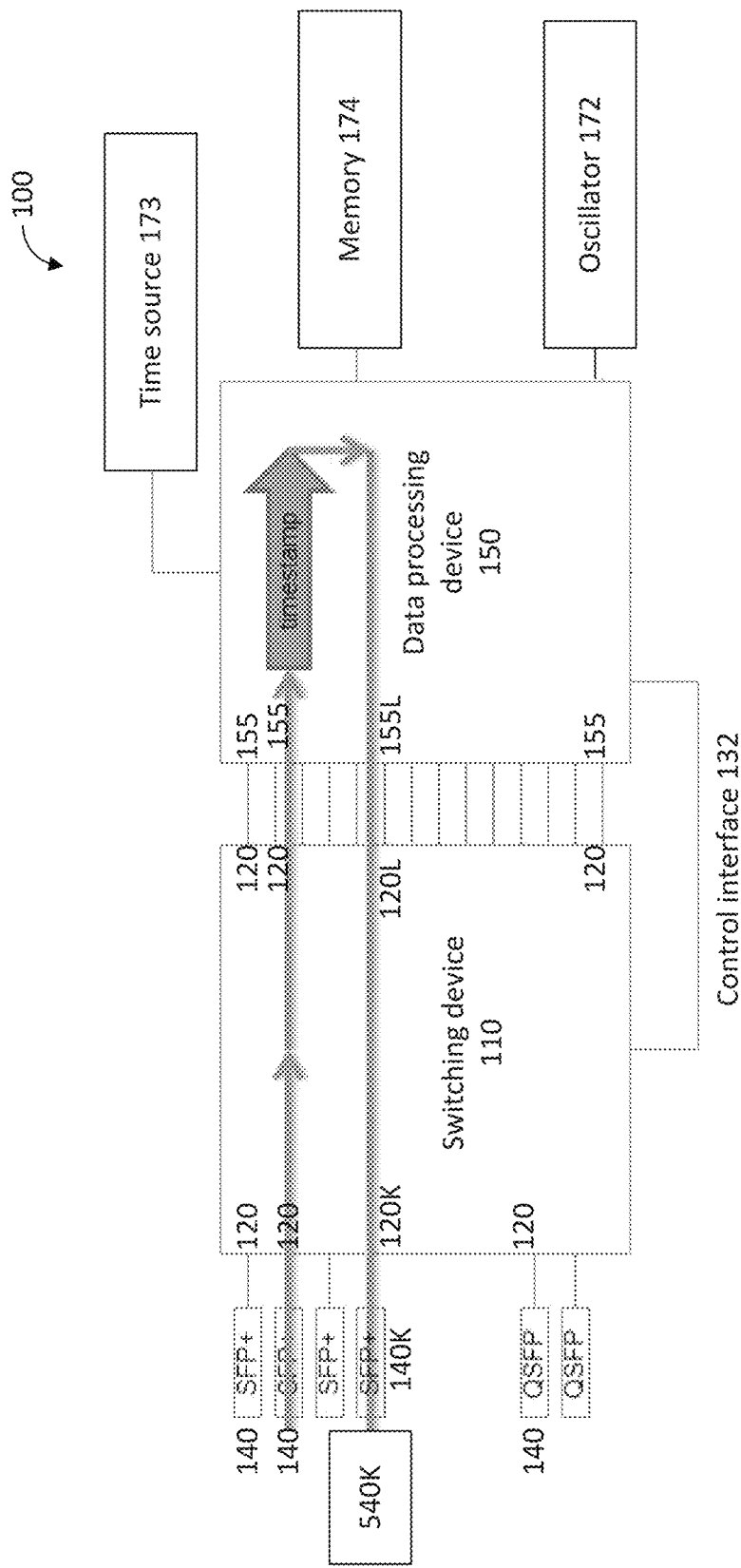
FIG. 5 schematically illustrates system an example computer system configured to provide OSI layer 2 and/or layer 3 routing functionality and traffic analysis, in accordance with one or more aspects of the present disclosure.

In certain implementations, as schematically illustrated by FIG. 5, system 100 may be configured to provide OSI layer 2 and/or layer 3 routing functionality and traffic analysis. In the illustrative example of FIG. 5, the electric signal representing one or more incoming data packets flowing through the switching device as described herein above (or a new electric signal derived from the above referenced electric signal) may be forwarded to data processing device 150 via one or more transceivers 155. Data processing device 150 may be programmed to forward an incoming data packet to a transceiver 155 which is selected based on the data comprised by the incoming data packets. In the illustrative example of FIG. 5, data processing device 150 may be programmed to implement an OSI layer 2 or layer 3 routing method, by forwarding an incoming data packet to a transceiver 155 which is selected based on the layer 2 and/or layer 3 destination address field of the incoming data packet. To perform the routing, data processing device 150 may store in its memory, for each external device which is communicatively coupled to switching device 110 via a transceiver 140, a mapping of the external device's address to the identifier of a transceiver 155 via which the electric signal encoding data packets addressed to the external device should be forwarded to switching device 100. In the illustrative example of FIG. 5, for external device 540K communicatively coupled to a transceiver 140K of switching device 110, data processing device 150 may store a mapping of the layer 2 and/or layer 3 addresses of external device 540K to the identifier of transceiver 155L via which the electric signal encoding data packets addressed to the external device 540K should be forwarded to switching device 100. Transceiver 155L may be defined as being communicatively coupled to I/O port 120L of switching device 100, wherein I/O port 120L is mapped to I/O port 120K electrically coupled to transceiver 140K.

In certain implementations, data processing device 150 may be programmed to insert additional data (such as time stamps) into the incoming data packets before forwarding the data packets back to switching device 110. In another illustrative example, data processing device 150 may be programmed to enqueue the incoming data packets into a buffer, and to compress the queued data packets before forwarding the data packets back to switching device 110.

Figure 6:
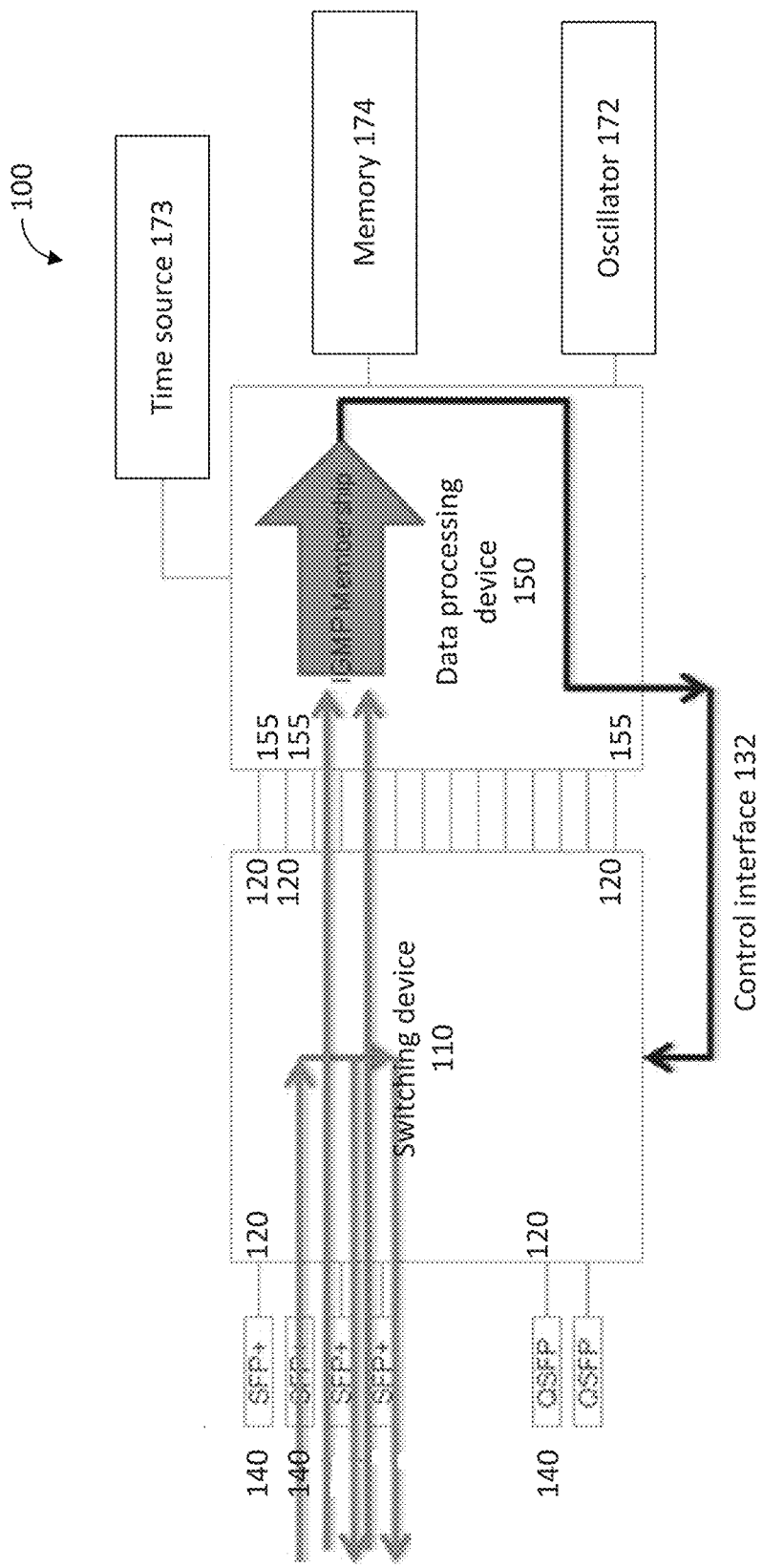
FIG. 6 schematically illustrates system an example computer system configured to provide low latency packet replication for distribution of traffic to multiple external devices, in accordance with one or more aspects of the present disclosure.

In certain implementations, as schematically illustrated by FIG. 6, system 100 may be configured to provide low latency packet replication for distribution of traffic, such as video streams and market data, to multiple external devices via respective output ports. The input data may be received by switching device 110 and transmitted to a plurality of output ports according to the port mapping provided by data processing device 150.

In the illustrative example of FIG. 6, the electric signal representing one or more incoming data packets (or a new electric signal derived from the above referenced electric signal) may be forwarded to one or more output ports coupled to the front panel pluggable transceiver sockets 140, as well as to data processing device 150 via one or more transceivers 155, in accordance with a port mapping scheme. Data processing device 150 may be programmed to analyze the data packets received, and compile the port mapping scheme based on the data comprised by the incoming data packets. In an illustrative example, the resulting port mapping scheme may implement a pre-defined or dynamically selectable protocol (e.g., IGMP). Data processing device 150 may output the port mapping scheme back to switching device 110 via control interface 132.

In certain implementations, system 100 may be configured to provide remote data replication in accordance with a pre-defined or dynamically configurable storage protocol (e.g., Serial Attached SCSI (SAS), Serial Advance Technology Attachment (SATA), or Fiber Channel). System 100 may route data packets between a host and a remote storage device. Switching device 110 may also forward the incoming data packets to data processing device 150, which may analyze and/or replicate the incoming data stream.

In certain implementations, data processing device 110 may be configured to implement dynamic re-routing of Ethernet or similar protocols. Two circuits may be added to each of the input ports: a data observing circuit and a phase detector circuit. The data observing circuit may passively observe the data packets flowing through switching device 110, in order to detect alignment bit patterns in accordance with a pre-defined or dynamically configurable bit encoding.

The data observing circuit may produce, for each input port, the encoding offset of the signal flowing through the input port.

The phase detector circuit may be added to observe the relative phase of each input port as compared to a reference clock source. The phase detector circuit may produce, for each input port, an offset index indicating the phase, relative to a reference clock, of the signal flowing through the input port.

To ensure that the phase and encoding alignment are preserved in the data stream being received by the external device connected to the output port when the output port is being switched by switching device 110, each output port may be equipped with a FIFO buffer of sufficient depth to store the requisite number of bits for one or more encodings being employed (e.g., 66 bits for 64b/66b encodings), and a multi-tap phase compensation device for aligning the output signal. Responsive to receiving a request to change the port mapping, switching device 110 may determine, using the data observing circuit, the skew between the alignment of the existing input port and the new input port. Based on the determined skew, switching device 110 may determine the depth of the buffering to be maintained by the FIFO buffer when the ports are switched.

Switching device 110 may further determine, using the phase detector circuit and taking into account the phase difference retrieved from the above referenced data structure, the phase difference between the existing input port and the new input port. Based on the determined alignment skew and phase difference, switching device 110 may determine optimal switching point in time, to ensure encoding block alignment and phase alignment. In certain implementations, the phase and encoding block alignment may be performed at the input ports, output ports, or split between the input and output ports as described herein above.

In certain implementations, system 100 may be configured to implement predictive packet switching, by performing low latency switching of flows in response to traffic patterns. Predictive packet switching is based on observing traffic patterns to determine future packet destinations based on preceding packets. Thus, switching device 110 may be dynamically reconfigured based on the observed packet history. Alternatively, explicit indicators in the packet flow may trigger dynamic reconfiguration of the packet flow.

In the first ("processing device optimized") mode of operation, switching device 110 may transmit multiple data streams from multiple source ports to multiple destination ports via data processing device 150. In this mode, switching device 150 may switch the traffic flow as well as analyze the data stream for an indication that transitioning to the second ("switching device optimized") operational mode is appropriate to accelerate the traffic.

Upon identifying characteristics of the traffic flow between an input port and an output port that would benefit from such acceleration, data processing device 150 may identify a period of idle frames in the input signal and trigger a reconfiguration of the NxM port matrix such that the output port would be directly connected to the input port, while preserving the phase and block alignment, as described herein above. This operational mode may be referred to as the "switching device optimized" mode.

In this mode, data processing device 150 may continue to monitor the data flow from the input port to the output port. If a data packet is received during the mode transition, data processing device 150 may temporarily reverse the mode transition, transmit the packet, and then transition again to "switching device optimized" mode.

While in the "switching device optimized" mode, data processing device 150 may monitor the data flow to identify situations where the "processing device optimized" mode may be required, for instance, where packets to other destinations are being received. Data processing device 150 may queue these packets in a locally connected memory 174, while initiating a reconfiguration of the NxM matrix such that traffic from the input port of switching device 110 would pass through data processing device 150. As part of this transition, data processing device 150 may transmit a stream of idle frames to switching device 110 which, in turn, may forward these signals to the output port, preserving protocol link layer connectivity as required. Upon completion of the transition to the "processing device optimized" mode, data processing device 150 may transmit the queued packets.

In the above described illustrative examples and other implementations, system 100 may comprise a tangible computer-readable storage medium on which may be stored instructions encoding the methods described herein. "Computer-readable storage medium" herein shall refer to any non-transitory medium that is capable of storing or encoding a set of instructions for execution by a computer system that cause the computer system to perform any one or more of the methods described herein. "Computer-readable storage medium" shall include, but not be limited to, solid-state memories, optical media, and magnetic media. As the instructions encoding the methods described herein may also reside, completely or partially, within the random access memory and/or within one or more processing devices of system 100, hence, the random access memory and processing devices may also constitute machine-readable storage media. The term "computer-readable storage medium" shall include a single medium or multiple media that store the one or more sets of executable instructions.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

The terms "first," "second," "third," "fourth," etc. as used herein are meant as labels to distinguish among different elements and may not necessarily have an ordinal meaning according to their numerical designation.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A system comprising:
a switching device including a first plurality of input/output (I/O) ports and a second plurality of I/O ports, wherein each port of the first plurality of I/O ports is electrically coupled to a pluggable transceiver socket configured to receive a cable connector; and
a processing device including a plurality of transceivers electrically coupled to the second plurality of I/O ports;
wherein the switching device is configured to receive, via a first I/O port of the first plurality of I/O ports, a first electric signal encoding one or more incoming data packets;
wherein the switching device includes a control interface receiving programming logic incorporating a programmable port mapping scheme instructing the switching device to output the first electric signal to a second I/O port of the first plurality of I/O ports and to a third I/O port of the second plurality of I/O ports, in accordance with the programmable port mapping scheme; and
wherein the processing device is configured to receive the first electric signal, and is programmed to output a second electric signal encoding one or more modified data packets derived from the incoming data packets, the processing device implementing a data compression algorithm to compress the incoming data packets and create the modified data packets, wherein the processing device transmits the modified data packets back to the switching device through at least one of the plurality of transceivers.

2. The system of claim 1, wherein the processing device is provided by at least one of: a field programmable gate array (FPGA) device and an application specific integrated circuit (ASIC) device.

3. The system of claim 1, wherein the switching device is programmed to implement a directional mapping of M ports of the first plurality of I/O ports to N ports of the first plurality of I/O ports, wherein M and N are positive integers.

4. The system of claim 1, wherein the pluggable transceiver socket is configured to support at least one of: Ethernet, Gigabit Ethernet, Fibre Channel, and SONET.

5. The system of claim 1, wherein the processing device is programmed to produce the modified data packets by performing at least one of: time stamping the incoming data packets, compressing the incoming data packets, queuing the incoming data packets, and filtering the incoming data packets.

6. The system of claim 1, wherein the switching device is configured to receive the programmable port mapping scheme from the processing device.

7. A system comprising:
a switching device including a first plurality of input/output (I/O) ports and a second plurality of I/O ports, wherein each port of the first plurality of I/O ports is electrically coupled to a pluggable transceiver socket configured to receive a cable connector; and
a processing device including a plurality of transceivers electrically coupled to the second plurality of I/O ports;
wherein the switching device is configured to receive, via a first I/O port of the first plurality of I/O ports, a first electric signal encoding one or more incoming data packets;
wherein the processing device is configured to receive the first electric signal, and is programmed to output a second electric signal encoding one or more modified data packets derived from the incoming data packets, the processing device implementing a data compression algorithm to compress the incoming data packets and create the modified data packets, wherein the processing device transmits the modified data packets back to the switching device through at least one of the plurality of transceivers; and
wherein the switching device includes a control interface receiving programming logic incorporating a programmable port mapping scheme instructing the switching device to output a third electric signal derived from the second electric signal to a second I/O port of the first plurality of I/O ports in accordance with the programmable port mapping scheme.

8. The system of claim 7, wherein the processing device is provided by at least one of: a field programmable gate array (FPGA) device and an application specific integrated circuit (ASIC) device.

9. The system of claim 7, wherein the switching device is programmed to implement a directional mapping of M ports of the first plurality of I/O ports to N ports of the first plurality of I/O ports, wherein M and N are positive integers.

10. The system of claim 7, wherein the pluggable transceiver socket is configured to support at least one of: Ethernet, Gigabit Ethernet, Fibre Channel, and SONET.

11. The system of claim 7, wherein the processing device is programmed to perform financial risk analysis of data comprised by the incoming data packets.

12. The system of claim 7, wherein the switching device is programmed to transmit return traffic from the second I/O port directly to the first I/O port.

13. The system of claim 7, wherein the switching device is configured to receive the programmable port mapping scheme from the processing device.

14. A system comprising:
a switching device including a first plurality of input/output (I/O) ports and a second plurality of I/O ports, wherein each port of the first plurality of I/O ports is electrically coupled to a pluggable transceiver socket configured to receive a cable connector; and
a processing device including a plurality of transceivers electrically coupled to the second plurality of I/O ports;
wherein the switching device is configured to receive, via a first I/O port of the first plurality of I/O ports, a first electric signal encoding one or more incoming data packets;
wherein the processing device is configured to receive the first electric signal, and is programmed to filter the incoming data packets based on transport level attributes of the incoming data packets and output a second electrical signal derived from the first electric signal via a second I/O port of the second plurality of I/O ports, the second I/O port being selected based on data comprised by the incoming data packets; and wherein the switching device includes a control interface receiving programming logic incorporating a programmable port mapping scheme instructing the switching device to output the second electric signal via a third I/O port of the first plurality of I/O ports in accordance with the programmable port mapping scheme.

15. The system of claim 14, wherein the processing device is provided by at least one of: a field programmable gate array (FPGA) device and an application specific integrated circuit (ASIC) device.

16. The system of claim 14, wherein the pluggable transceiver socket is configured to support at least one of: Ethernet, Gigabit Ethernet, Fibre Channel, and SONET.

17. The system of claim 14, wherein the third I/O port is selected based on one of: OSI layer 2 destination addresses of the incoming data packets or OSI layer 3 destination addresses of the incoming data packets.

18. The system of claim 14, wherein the second electric signal is encoding one or more modified data packets derived from the incoming data packets.

19. The system of claim 14, wherein the processing device is programmed to produce the second electric signal by performing at least one of: time stamping the incoming data packets, compressing the incoming data packets, queuing the incoming data packets, and filtering the incoming data packets.

20. A system comprising:
a switching device including a first plurality of input/output (I/O) ports and a second plurality of I/O ports, wherein each port of the first plurality of I/O ports is electrically coupled to a pluggable transceiver socket configured to receive a cable connector; and a processing device including a plurality of transceivers electrically coupled to the second plurality of I/O ports;

wherein the switching device is configured to receive, via a first I/O port of the first plurality of I/O ports, a first electrical signal encoding one or more incoming data packets;

wherein the switching device includes a control interface receiving programming logic from the processing device, the programming logic incorporating a programmable port mapping scheme instructing the switching device to output the first electric signal to a second I/O port of the first plurality of I/O ports and to a third I/O port of the second plurality of I/O ports, in accordance with the programmable port mapping scheme received from the processing device; and wherein the processing device is configured to receive the first electric signal via the third I/O port, and is programmed to filter the incoming data packets based on transport level attributes of the incoming data packets and output the port mapping scheme based on analyzing the incoming data packets.

21. The system of claim 20, wherein the processing device is provided by at least one of: a field programmable gate array (FPGA) device and an application specific integrated circuit (ASIC) device.

22. The system of claim 20, wherein the switching device is programmed to implement a directional mapping of M ports of the first plurality of I/O ports to N ports of the first plurality of I/O ports, wherein M and N are positive integers.

23. The system of claim 20, wherein the pluggable transceiver socket is configured to support at least one of: Ethernet, Gigabit Ethernet, Fibre Channel, and SONET.

24. The system of claim 20, wherein the programmable port mapping scheme is configured to implement Internet Group Management Protocol (IGMP).

* * * * *